US012444401B2

(12) United States Patent
Lin et al.

(10) Patent No.: US 12,444,401 B2
(45) Date of Patent: Oct. 14, 2025

(54) METHOD, APPARATUS, COMPUTER READABLE MEDIUM, AND ELECTRONIC DEVICE OF SPEECH SYNTHESIS

(71) Applicant: Beijing Youzhuju Network Technology Co., Ltd., Beijing (CN)

(72) Inventors: Haopeng Lin, Beijing (CN); Zejun Ma, Beijing (CN)

(73) Assignee: Beijing Youzhuju Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/815,598

(22) Filed: Aug. 26, 2024

(65) Prior Publication Data

US 2024/0420678 A1 Dec. 19, 2024

Related U.S. Application Data

(63) Continuation of application No. PCT/CN2023/077478, filed on Feb. 21, 2023.

(30) Foreign Application Priority Data

Feb. 25, 2022 (CN) .................... CN202210179831.4

(51) Int. Cl.
*G10L 13/08* (2013.01)
*G10L 13/02* (2013.01)

(52) U.S. Cl.
CPC .............. *G10L 13/08* (2013.01); *G10L 13/02* (2013.01)

(58) Field of Classification Search
CPC ................................ G10L 13/08; G10L 13/02
See application file for complete search history.

(56) References Cited

U.S. PATENT DOCUMENTS 6,178,402 B1 * 1/2001 Corrigan ................. G10L 15/02 704/260
7,136,816 B1 * 11/2006 Strom ..................... G10L 13/10 704/260

(Continued)

FOREIGN PATENT DOCUMENTS

CN 106683667 A 5/2017
CN 110534089 A 12/2019

(Continued)

OTHER PUBLICATIONS

Lam, Quang Tuong, et al. "Alternative vietnamese speech synthesis system with phoneme structure." 2019 19th International Symposium on Communications and Information Technologies (ISCIT). IEEE, 2019. (Year: 2019).*

(Continued)

*Primary Examiner* — Anne L Thomas-Homescu
(74) *Attorney, Agent, or Firm* — BakerHostetler

(57) ABSTRACT

A method, apparatus, a computer readable medium, and an electronic device of speech synthesis. The method includes: obtaining a phoneme sequence corresponding to text to be synthesized; generating a phonemic-level TOBI representation sequence and a prosodic-acoustic feature corresponding to the text to be synthesized based on the phoneme sequence and the text to be synthesized, and generating acoustic feature information corresponding to the text to be synthesized based on the TOBI representation sequence and the prosodic-acoustic feature; and generating first audio information corresponding to the text to be synthesized based on the acoustic feature information. The method enables the synthesized audio to be more natural, cadenced, and aligned with the intended semantics of a speaker.

14 Claims, 7 Drawing Sheets

(56) References Cited

U.S. PATENT DOCUMENTS

| | | | | |
|---|---|---|---|---|
| 8,214,216 | B2 * | 7/2012 | Sato | G10L 13/027<br>704/263 |
| 2003/0028376 | A1 * | 2/2003 | Meron | G10L 13/06<br>704/258 |
| 2003/0061048 | A1 * | 3/2003 | Wu | G10L 13/08<br>704/E13.011 |
| 2004/0030555 | A1 * | 2/2004 | van Santen | G10L 13/08<br>704/E13.011 |
| 2007/0055526 | A1 * | 3/2007 | Eide | G10L 13/10<br>704/260 |
| 2021/0350795 | A1 | 11/2021 | Kenter et al. | |
| 2022/0189455 | A1 * | 6/2022 | Pekar | G10L 13/02 |

FOREIGN PATENT DOCUMENTS

| | | | | | |
|---|---|---|---|---|---|
| CN | 110782870 | A | | 2/2020 | |
| CN | 111754976 | A | | 10/2020 | |
| CN | 111754978 | A | | 10/2020 | |
| CN | 112289304 | A | | 1/2021 | |
| CN | 112365880 | A | | 2/2021 | |
| CN | 112786006 | A | | 5/2021 | |
| CN | 112786008 | A | | 5/2021 | |
| CN | 113327580 | A | * | 8/2021 | G10L 13/10 |
| CN | 113421550 | A | * | 9/2021 | |
| CN | 114495902 | A | | 5/2022 | |
| GB | 2598563 | A | | 3/2022 | |
| KR | 20060015744 | A | * | 2/2006 | |
| WO | WO 2004/109659 | A1 | | 12/2004 | |
| WO | WO 2006/104988 | A1 | | 10/2006 | |
| WO | WO 2021/183229 | A1 | | 9/2021 | |

OTHER PUBLICATIONS

Li, Hao, Yongguo Kang, and Zhenyu Wang. “Emphasis: An emotional phoneme-based acoustic model for speech synthesis system.” arXiv preprint arXiv:1806.09276 (2018). (Year: 2018).*

Sarma, Shikar Kr, and Nabamita Deb. “Tones and break indices (ToBI) generation for Assamese sentences.” 2016 2nd International Conference on Next Generation Computing Technologies (NGCT). IEEE, 2016. (Year: 2016).*

International Patent Application No. PCT/CN2023/077478; Int’l Written Opinion and Search Report; dated Jun. 1, 2023; 9 pages.

Zou et al.; “Fine-grained prosody modeling in neural speech synthesis using ToBI representation”; INTERSPEECH; 2021; p. 3146-3150.

Chinese Patent Application No. 202210179831.4; Office Action dated Mar. 21, 2025, 15 pages with machine translation.

Yumeng Wang, “The method and implementation of ToBI automatic prosodic labeling in English text to speech system,” Masters Thesis, May 2016, 67 pages with English abstract.

Chinese Patent Application No. 202210179831.4; Notification to Grant Patent Right dated Aug. 18, 2025, 6 pages with machine translation.

* cited by examiner

METHOD, APPARATUS, COMPUTER READABLE MEDIUM, AND ELECTRONIC DEVICE OF SPEECH SYNTHESIS

CROSS REFERENCE TO RELATED APPLICATIONS

This application is a continuation of International Patent Application No. PCT/CN2023/077478, filed on Feb. 21, 2023, which claims the priority of CN Patent Application No. 202210179831.4, filed on Feb. 25, 2022, both of which are incorporated herein by reference in their entireties.

FIELD

The present disclosure relates to the field of speech synthesis technologies, and in particular, to a method, an apparatus, a computer readable medium, and an electronic device of speech synthesis.

BACKGROUND

In linguistics, prosody refers to the composition of non-independent segments (vowels and consonants) during speech, i.e., the features of syllables or larger units. These features form language functions such as tone, intonation, stress, and rhythm. Prosody can reflect multiple features of a speaker or an utterance: an emotional state of the speaker, a form of the utterance (statement, question, or command), whether stress, contrast, or focus exists, and other language elements that cannot be represented by grammar and vocabulary. Different representation forms of the same prosodic event can convey rich semantics and emotional changes thereof. In tasks such as speech synthesis, how to combine prosodic features of text to obtain synthesized audio which is more natural and smoother has become a focus of research.

SUMMARY

This section is provided to introduce concepts in a simplified form that are subsequently described in detail in the Detailed Description. This Summary is not intended to identify key features or essential features of the claimed subject matter, nor to limit the scope of the claimed subject matter.

According to a first aspect, the present disclosure provides a speech synthesis method, comprising:

obtaining a phoneme sequence corresponding to the text to be synthesized;

generating a phonemic-level tones and break indices (TOBI) representation sequence and a prosodic-acoustic feature corresponding to the text to be synthesized based on the phoneme sequence and the text to be synthesized, and generating acoustic feature information corresponding to the text to be synthesized based on the TOBI representation sequence and the prosodic-acoustic feature; and generating first audio information corresponding to the text to be synthesized based on the acoustic feature information.

According to a second aspect, the present disclosure provides a speech synthesis apparatus, comprising:

an obtaining module configured to obtain a phoneme sequence corresponding to a text to be synthesized;

a first generating module configured to generate a phonemic-level TOBI representation sequence and a prosodic-acoustic feature corresponding to the text to be synthesized based on the phoneme sequence obtained by the acquiring module and the text to be synthesized, and to generate acoustic feature information corresponding to the text to be synthesized based on the TOBI representation sequence and the prosodic-acoustic feature; and a second generating module configured to generate, based on the acoustic feature information generated by the first generation module, first audio information corresponding to the text to be synthesized.

According to a third aspect, the present disclosure provides a computer readable medium having a computer program stored thereon, the computer program, when executed by a processing device, implementing steps of the method in accordance with the first aspect of the present disclosure.

In a fourth aspect, the present disclosure provides an electronic device, comprising:

a storage device having at least one computer program stored thereon;

at least one processing apparatus configured to execute the at least one computer program in the storage device to implement steps of the method in accordance with the first aspect of the present disclosure.

In a fifth aspect, the disclosure provides a computer program, when executed by a processing apparatus, implementing steps of the method in accordance with the first aspect of the present disclosure.

In a sixth aspect, the present disclosure provides a computer program product comprising a computer program which, when executed by a processing device, implements steps of the method in accordance with the first aspect of the present disclosure.

Additional features and advantages of the disclosure will be set forth in the specific implementation which follows.

BRIEF DESCRIPTION OF THE DRAWINGS

The above and other features, advantages, and aspects of various embodiments of the present disclosure will become more apparent with reference to the following specific implementation taken in conjunction with the accompanying drawings. Throughout the drawings, the same or like reference numerals denote the same or like elements, it being understood that the drawings are illustrative, and that elements and components may not be drawn to scale. In the drawings.

DETAILED DESCRIPTION

Figure 1:
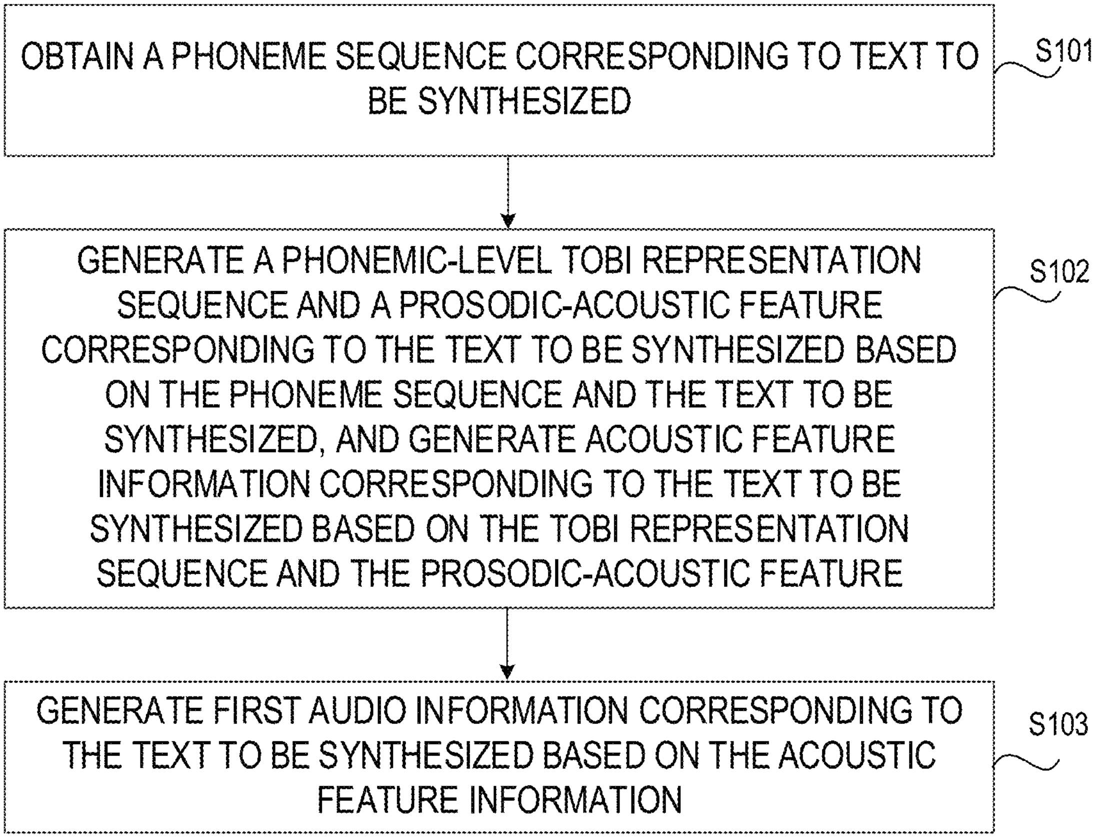
FIG. 1 is a flowchart illustrating a speech synthesis method according to an example embodiment.

As discussed in the Background, in tasks such as speech synthesis, how to combine prosodic features of text to make synthesized audio more naturally and smoothly becomes a focus of research. In order to improve the naturalness of the synthesized audio, a speech synthesis method at the present stage mainly implements prosodic control of the synthesized audio by using prosodic features at a language level, i.e., manually labeled TOBI (Tones and Break Indices) data, so as to improve the naturalness of speech synthesis, but the intensity of the synthesized audio is uncontrollable.

In view of this, the present disclosure provides a speech synthesis method and apparatus, a computer readable medium, and an electronic device.

Embodiments of the present disclosure will be described in more detail below with reference to the accompanying drawings. Although certain embodiments of the present disclosure are shown in the drawings, it should be understood that the present disclosure may be implemented in various forms and should not be construed as being limited to the embodiments set forth herein, but rather these embodiments are provided for a thorough and complete understanding of the present disclosure. It should be understood that the drawings and embodiments of the present disclosure are only for illustrative purposes and are not intended to limit the scope of the present disclosure.

It should be understood that, the steps recorded in the method embodiments of the present disclosure may be executed in different orders, and/or executed in parallel. Furthermore, method embodiments may include additional steps and/or omit performing the steps illustrated. The scope of the present disclosure is not limited in this respect.

The term "comprising," and variations thereof, as used herein, is inclusive, i.e., "including but not limited to". The term "based on" is "based at least in part on". The term "one embodiment" means "at least one embodiment"; the term "another embodiment" means "at least one further embodiment". The term "some embodiments" means "at least some embodiments". Relevant definitions of other terms will be given in the following description.

It should be noted that, the "first", "second", and other concepts mentioned in the present disclosure are only used to distinguish different apparatuses, modules, or units, but are not used to limit the sequence or dependency of functions performed by these apparatuses, modules, or units.

It should be noted that the modifications of "a" and "a plurality" mentioned in the present disclosure are illustrative rather than restrictive, and those skilled in the art should understand that they should be understood as "one or more" unless the context clearly indicates otherwise.

The names of messages or information interacted between a plurality of devices in the embodiments of the present disclosure are only for illustrative purposes, and are not intended to limit the scope of these messages or information.

FIG. 1 is a flowchart of a speech synthesis method according to an example embodiment. As shown in FIG. 1, the method includes S101-S103.

At S101, a phoneme sequence corresponding to a text to be synthesized is obtained.

In the present disclosure, the text to be synthesized may be Chinese, English, Japanese, and other languages. In addition, a phoneme sequence corresponding to the text to be synthesized may be obtained by using a Grapheme-to-phoneme (G2P) model.

For example, the G2P model may employ a recurrent Neural Network (RNN) and Long Short-Term Memory (LSTM) to achieve conversion from graphemes to phonemes.

At S102, a phonemic-level TOBI representation sequence and a prosodic-acoustic feature corresponding to a text to be synthesized are generated according to the phoneme sequence and the text to be synthesized, and acoustic feature information corresponding to the text to be synthesized is generated according to the TOBI representation sequence and the prosodic-acoustic feature.

In the present disclosure, a TOBI representation sequence is used for embodying a prosodic feature of a text language level to be synthesized, i.e., a prosodic language feature, which refers to a prosodic language phenomenon defined by a TOBI system in an original linguistic sense, and belongs to a discrete feature, which may specifically comprise tone, intonation, pitch accent and stress, and prosodic boundary.

The tone refers to a change in the rising and falling of pitch in speech. For example, there are four tones in Chinese: "yangping", "yinping", "shangsheng", and "qusheng". The English language includes stress, secondary stress, and weak forms, and the Japanese language includes stressed syllables and weak syllables.

The intonation, i.e., the intonation of a speech, is the configuration and change of speed and stress in a sentence. In addition to lexical meaning, a sentence also has an intonation meaning. The intonation meaning is an attitude or a tone expressed by the intonation of the speaker. The intonation meaning plus the lexical meaning of a sentence is what makes the sentence fully meaningful. The same sentence with different intonation may convey different meaning, sometimes even vary significantly.

Pitch accent, which is used for describing pitch variation of a stressed syllable. Moreover, the pitch accent may control the rhythm of emphasized information and a syllable rhythm-type language, and the pitch accent is mainly used for the primary stressed syllable, or the primary stressed syllable and the syllable after it. In the present disclosure, pitch control is performed only on the primary stressed syllable, and redundant information on other syllables and zero syllable is ignored, so as to achieve the effect of information simplification. Accordingly, the pitch information is used to indicate a syllable position where a specified pitch phenomenon exists in a text to be synthesized, where the specified pitch phenomenon may include a high pitch, a low pitch, a rising pitch, a low rising pitch, and a high falling pitch.

Specifically, for a high pitch, the pitch target is in a high level. The fundamental frequency (f0) curve of a high pitch is high and flat. The high pitch sounds like "yinping" in Chinese. For a low pitch, the pitch target is in a low level. The fundamental frequency curve of a low pitch is low and flat. The low pitch sounds like the first half of "shangsheng" in chinese. For a rising pitch, the pitch target is in a high level. The fundamental frequency curve of a rising pitch is trending upward. The rising pitch sounds like "yangping" in Chinese. For a low rising pitch, the target pitch is in a low level. If the low rising pitch is used for single syllable, the fundamental frequency curve is trending downward with a slight rise at the end. If the low rising pitch is used for double syllable, the fundamental frequency curve is trending downward in the primary stressed syllable and trending upward in the syllable after the primary stressed syllable. The low rising pitch sounds like "shangsheng" in Chinese. For a high falling pitch, the target pitch is in a high level. The fundamental frequency curve of a high falling pitch is trending downward. The high falling pitch sounds like "qusheng" in Chinese.

Prosodic boundary is used to indicate places where a pause should be performed during synthesize the text. For example, the prosodic boundary is divided into four stop levels: "#1", "#2", "#3" and "#4". The stop degrees of the four stop levels increase sequentially. There is no obvious prosodic level in English and Japanese, so the prosodic level in English and Japanese is empty.

However, a prosodic-acoustic feature (namely, a prosodic feature at an acoustic level) defines a measurement physical quantity representing a speech acoustic feature in a broad range, such as tone, formant, fundamental frequency or formant intensity. More closely linked to prosodic events defined by the linguistic ToBI architecture comprises: duration, fundamental frequency, and energy, for example, a high-rising of a prosodic linguistic feature "pitch" may be specifically represented as a high-pitch point in a speech segment in which a corresponding fundamental frequency continuously climbs into a sentence. Therefore, the prosodic-acoustic features in the present disclosure comprise at least one of a fundamental frequency, energy and a pronunciation duration of a phonemic-level corresponding to a text to be synthesized, which is a continuity feature.

The acoustic feature information may be, for example, a mel spectrum or a spectral envelope, etc.

At S103, first audio information corresponding to the text to be synthesized is generated based on the acoustic feature information.

In the present disclosure, the first audio information corresponding to the text to be synthesized may be obtained by inputting acoustic feature information into a vocoder. The vocoder may be, for example, a Wavenet vocoder or a Griffin-Lim vocoder, etc.

In the described technical solution, after a phoneme sequence corresponding to a text to be synthesized is obtained, a phonemic-level TOBI representation sequence and a prosodic-acoustic feature corresponding to the text to be synthesized are generated based on the phoneme sequence and the text to be synthesized, and acoustic feature information corresponding to the text to be synthesized is generated based on the TOBI representation sequence and the prosodic-acoustic feature. Finally, first audio information corresponding to the text to be synthesized is generated based on the acoustic feature information. During speech synthesis, a TOBI representation sequence corresponding to a text to be synthesized and a prosodic-acoustic feature are simultaneously referred to, i.e., not only a prosodic feature of a language level of the text to be synthesized is referred to, but also a prosodic feature of an acoustic level of the text to be synthesized is referred to, and the performance of the prosody in different dimensions is considered. According to a TOBI representation sequence, different sentences may be given appropriate rhythmic, emphasis and tone characteristics. Moreover, a corresponding prosodic-acoustic feature may explicitly represent a specific acoustic reflection of a corresponding prosody event. Thus, the intensity (i.e., amplitude) of the audio is controlled while improving the prosody naturalness of the synthesized audio, for example, different intensities may be allocated at a plurality of stressed positions so as to realize different emphasis focuses of semantic expression, or the change in the semantics of the interrogative sentence is achieved by intensity adjustment to convey different semantics (sentiment). Thus, under the same prosodic language expression, different prosodic-acoustic characteristics reflect different semantic changes, so that the synthesized audio is more natural with a lilting sound. Moreover, the information conveyed by the synthesized audio conforms with the semantics expressed by the speaker more closely.

Specific implementations of generating phonemic-level TOBI representing sequences and prosodic-acoustic features corresponding to the text to be synthesized based on the phoneme sequence and the text to be synthesized, and generating acoustic feature information corresponding to the text to be synthesized based on the TOBI representing sequences and the prosodic-acoustic features at S102 are described in detail below.

Specifically, the phoneme sequence and the text to be synthesized may be input into a pre-trained speech synthesis model, so as to generate a phonemic-level TOBI representation sequence and a prosody acoustic feature corresponding to the text to be synthesized based on the phoneme sequence and the text to be synthesized by using the speech synthesis model, and generate acoustic feature information corresponding to the text to be synthesized based on the TOBI representation sequence and the prosodic-acoustic feature.

Figure 2:
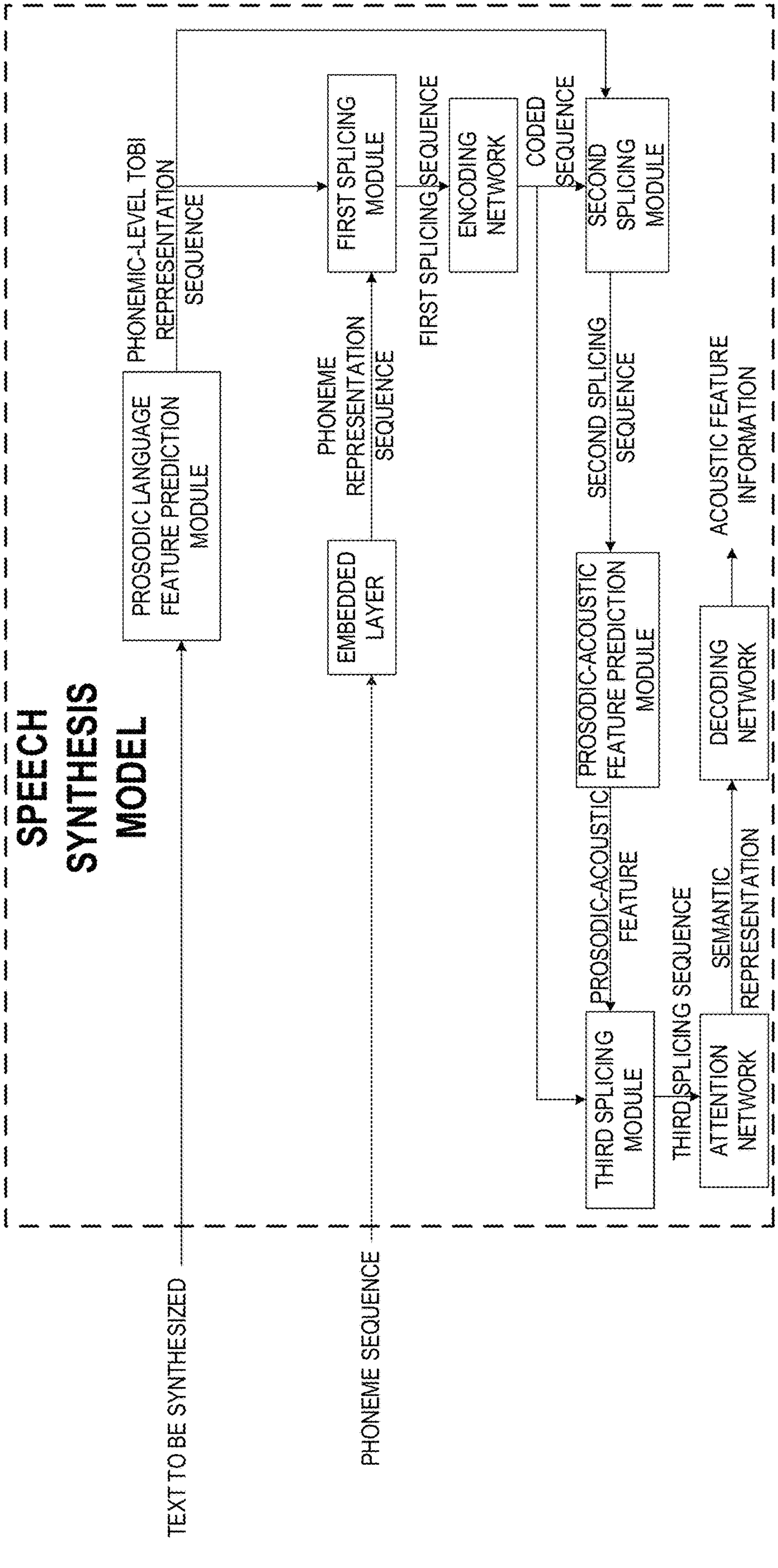
FIG. 2 is a schematic structural diagram of a speech synthesis model according to an example embodiment.

As shown in FIG. 2, the described speech synthesis model comprises an encoding network, an attention network, a decoding network, a prosodic language feature prediction module, a prosodic-acoustic feature prediction module, an embedded layer, a first splicing module, a second splicing module and a third splicing module. The prosodic language feature prediction module, the first splicing module, the encoding network, the second splicing module, the prosodic-acoustic feature prediction module, the third splicing module, the attention network and the decoding network are connected in sequence, Furthermore, the first splicing module is also connected to the embedded layer, and the second splicing module is also connected to the prosodic characteristic prediction module, The third splicing module is further connected to the coding network.

Specifically, the prosodic language feature predicting module is configured to generate a phonemic-level TOBI representation sequence corresponding to a text to be synthesized based on the text to be synthesized.

The embedded layer is configured to generate a phoneme representation sequence corresponding to a text to be synthesized based on a phoneme sequence. The phoneme representation sequence is formed by sequencing word vectors corresponding to various phonemes in the text to be synthesized according to a sequential order of the corresponding phonemes in the text to be synthesized, and the word vectors corresponding to the various phonemes in the synthetic text may be determined based on a pre-established correspondence between the phonemes and the word vectors.

The first splicing module is configured to splice the phonemic-level TOBI representation sequence and the phoneme representation sequence to obtain a first splicing sequence.

The encoding network is configured to encode the first splicing sequence to generate an encoding sequence.

The second splicing module is configured to splice the coding sequence and a phonemic-level TOBI representation sequence to obtain a second splicing sequence.

The prosodic-acoustic feature prediction module is configured to generate a prosodic-acoustic feature corresponding to the text to be synthesized based on the second splicing sequence.

By way of example, the prosodic-acoustic feature prediction module may be a shallow layer network of convolution layers+bidirectional LSTM layers+fully connected layers.

The third splicing module, configured to splice the coding sequence and the prosodic-acoustic feature to obtain a third splicing sequence.

The attention network is configured to generate a semantic representation corresponding to the text to be synthesized based on the third splicing sequence. For example, an attention network may be an attention network of locality sensitive attention, and may also be an attention network based on a Gaussian mixture model (GMM), that is, GMM attention.

The decoding network is configured to generate acoustic feature information corresponding to a text to be synthesized based on the semantic representation.

Figure 3:
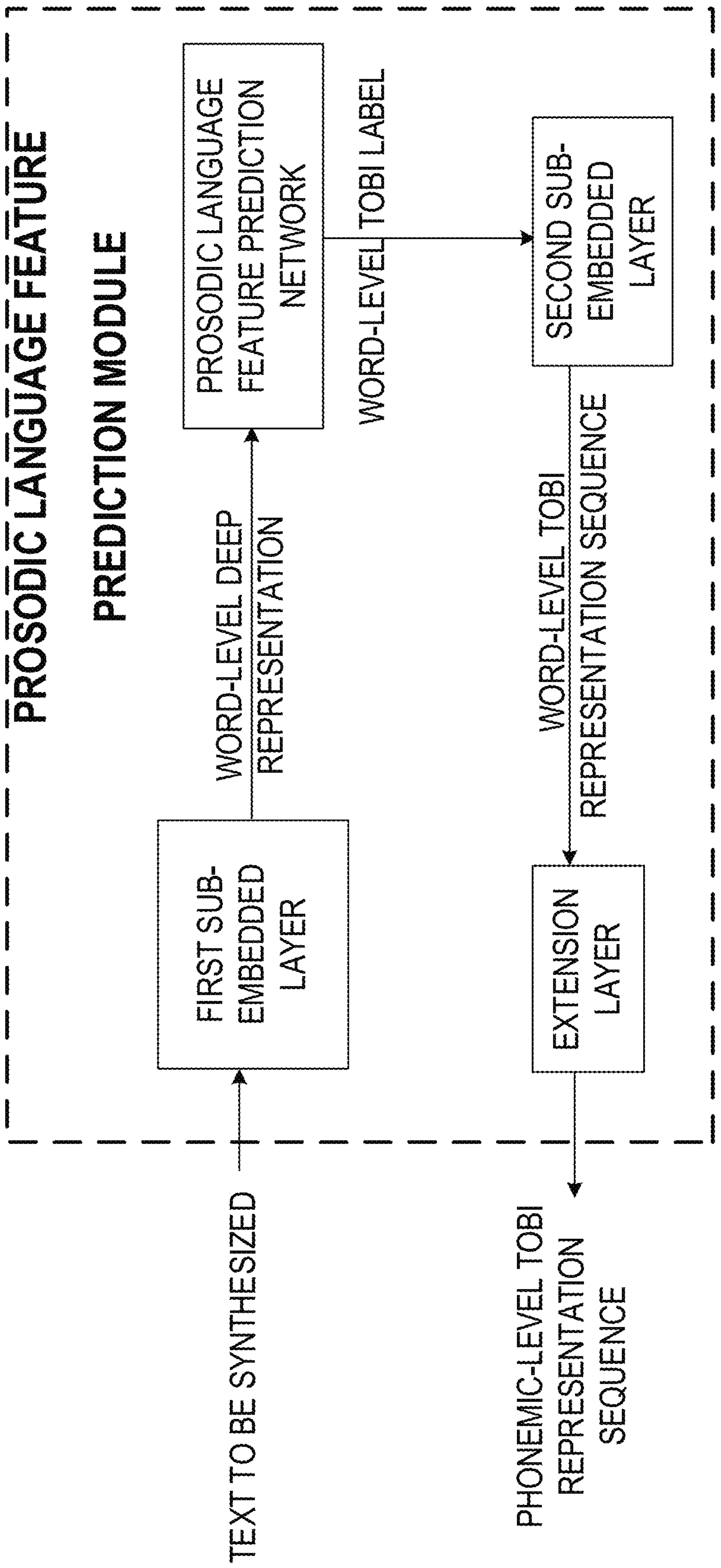
FIG. 3 is a block diagram illustrating a prosodic language feature prediction module according to an example embodiment.

As shown in FIG. 3, the described prosodic language feature prediction module comprises: a first sub-embedded layer, a prosodic language feature prediction network, a second sub-embedded layer and an extension layer which are connected in sequence.

Specifically, the first sub-embedded layer is configured to extract deep-level representation of word-level corresponding to the text to be synthesized. For example, the first sub-embedded layer may be a TinyBert model based on distillation learning.

A prosodic language feature prediction network is configured to generate a TOBI label at a word-level based on the deep representation. The TOBI label may comprise an intonation, a tone, a pitch accent, and a prosodic boundary.

For example, the prosodic language feature prediction network may be a shallow network consisting of a convolution layer, a bidirectional LSTM layer, and a fully connected layer.

The second sub-embedded layer is configured to generate a TOBI representation sequence of a word level corresponding to the text to be composed according to the TOBI label.

The extension layer is configured to extend a word-level TOBI representation sequence to obtain a phonemic-level TOBI representation sequence corresponding to a text to be synthesized.

Specifically, for each word in the text to be synthesized, a TOBI representation at a word-level corresponding to the word is replicated L−1 times to obtain a TOBI representation at a phoneme level corresponding to the word, where L is the number of phonemes included in the word.

For example, the text to be synthesized comprises a word A and a word B connected in sequence. The word A comprises three phonemes, the word B comprises four phonemes, a TOBI representation at a word-level corresponding to the word A is M, and a TOBI representation at a word-level corresponding to the word B is N, then the TOBI representation at the phonemic-level corresponding to the word A is MMM, the TOBI representation corresponding to the word B is characterized as NNN, and a TOBI at the phonemic-level corresponding to the text to be synthesized is a sequence of MMMNNNN.

Figure 4:
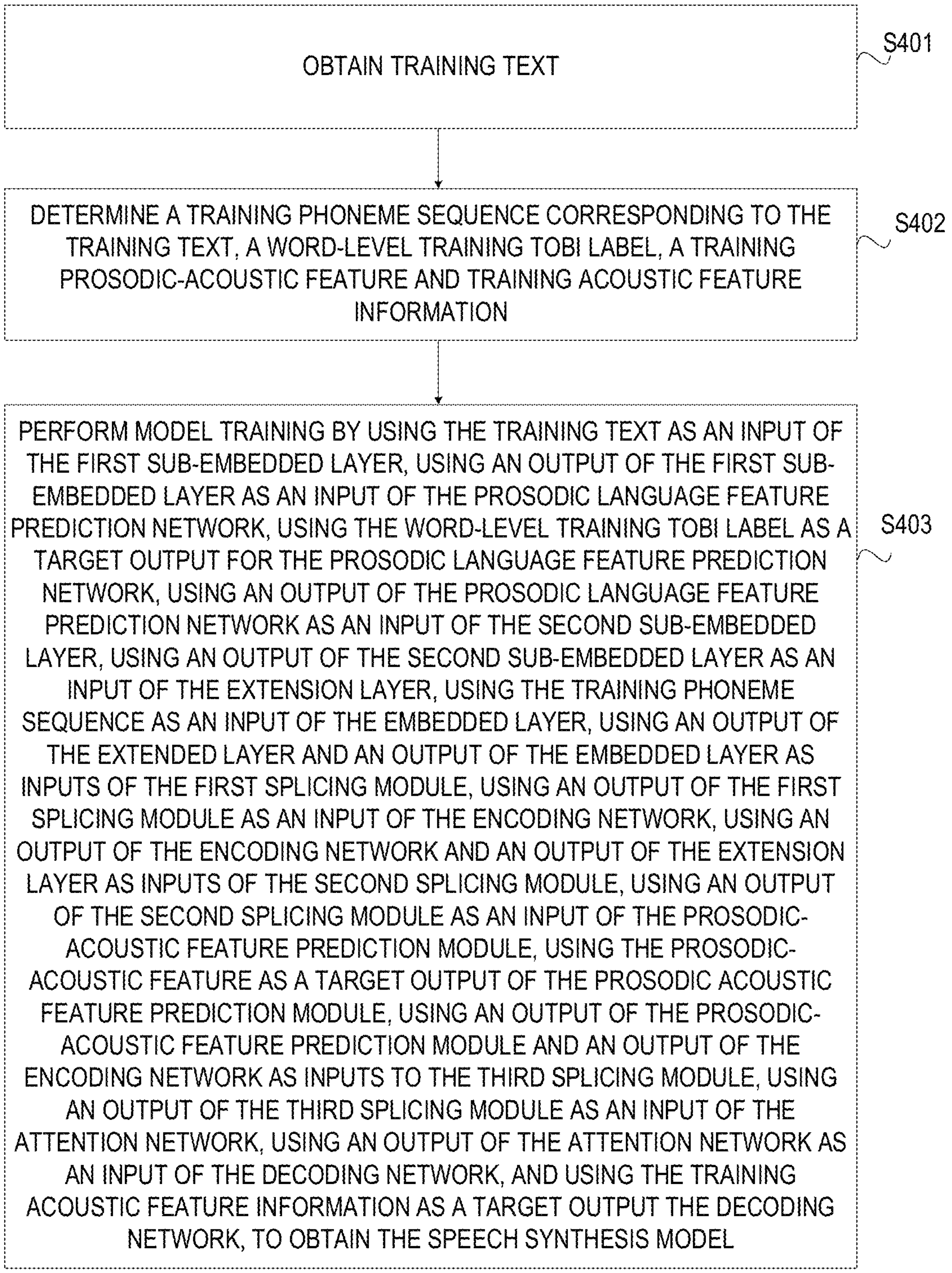
FIG. 4 is a flowchart illustrating a method of training a speech synthesis model, according to an example embodiment.

In addition, the foregoing speech synthesis model may be obtained through training at S401-S403 shown in FIG. 4.

At S401, a training text is obtained.

At S402, a training phoneme sequence corresponding to the training text, a word level training TOBI label, a training prosody acoustic feature, and training acoustic feature information are determined.

In the present disclosure, a training text may be a text extracted from an existing speech, and a labeling person may first label a word-level TOBI (i.e., a word-level training TOBI label) corresponding to the training text by means of listening to a speech corresponding to the training text.

The training phoneme sequence corresponding to the training text may be obtained in the same manner as that for obtaining the phoneme sequence corresponding to the text to be synthesized at S101.

In addition, the training prosodic-acoustic feature corresponding to the training text may be determined in the following manner: a fundamental frequency and energy feature at a frame level may be extracted from a real speech corresponding to the training text based on an open source tool (such as librosa or straight), Then, for each phoneme in the training text, an average value of a fundamental frequency of a plurality of frames corresponding to the phoneme may be used as the fundamental frequency of the phoneme, and an average value of the energy of the phonemes of a plurality of frames corresponding to the phoneme may be used as the energy of the phonemes, i.e. obtaining a fundamental frequency of a phoneme level and the energy of the phoneme level. Meanwhile, a pronunciation duration of each phoneme in the training text is obtained based on a forced alignment tool.

In addition, the training acoustic feature information corresponding to the training text, e.g., the mel spectral feature information, may be obtained by inputting the training text into a speech synthesis model (e.g., Tacotron model, Deepspeech 3 model, Tacotron 2 model, or Wavenet model, etc.).

At S403, the output of the first sub-embedded layer is taken as the input of the prosodic language feature prediction network by taking the training text as the input of the first sub-embedded layer, taking a word-level training TOBI label as a target output of a prosodic language feature prediction network, and using an output of the prosodic language feature prediction network as an input of a second sub-embedded layer. The output of the second sub-embedded layer is used as the input of the extension layer, and the training phoneme sequence is used as the input of the embedded layer, In the present disclosure, the loss function when the speech synthesis model is trained is the sum of the loss of the acoustic feature information and the loss of the prosodic feature loss. The loss of acoustic feature information is a mean square deviation between the acoustic feature information predicted by the decoding network and the training acoustic feature information. The loss of the prosodic feature comprises a loss of prediction of a prosodic language feature and a loss of prediction of a prosodic-acoustic feature. The loss of prediction of a prosodic language feature is a cross entropy loss between a TOBI of a word-level predicted by the prosodic language feature prediction network and a training TOBI label of the word-level. The loss of prediction of a prosodic-acoustic feature is the mean square deviation between the prosodic-acoustic features predicted by the prosodic-acoustic feature prediction module and the training prosodic-acoustic features.

Figure 5:
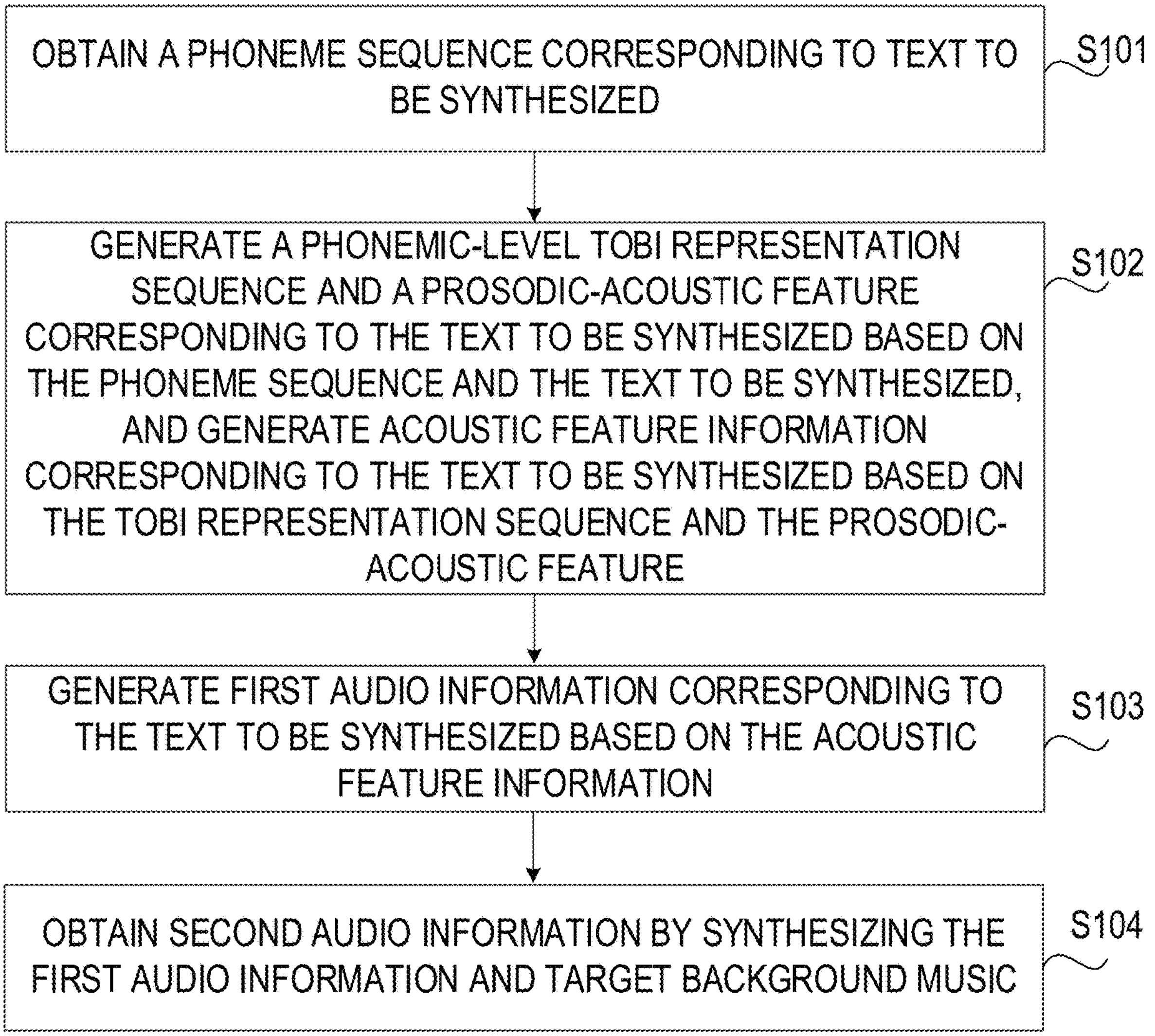
FIG. 5 is a flowchart illustrating a speech synthesis method according to another example embodiment.

In addition, in order to improve user experience, after the first audio information corresponding to the text to be synthesized is obtained at Step 103, background music may further be added for the first audio information. In this way, according to the background music and the first audio information, a user may more easily understand corresponding text content. Specifically, as shown in FIG. 5, the method may further include the following step S104.

At S104, synthesize the first audio information and the target background music to obtain the second audio information.

In an implementation, the target background music may be preset music, any piece of music set by a user, or default music.

In another implementation, before the first audio information and the target background music are synthesized, usage scenario information corresponding to the text to be synthesized may be determined based on the text information of the text to be synthesized. The usage scenario information comprises, but is not limited to, a news broadcast, a military introduction, a baby story, a campus broadcast, and the like. Then, target background music matching with the use scene information is determined based on the use scene information.

In the present disclosure, the text information may be a keyword. In this case, the keyword may be automatically identified for the text to be synthesized, so as to intelligently predetermine the use scenario information of the text to be synthesized based on the keyword.

After the usage scenario information corresponding to the text to be synthesized is determined, target background music matching the usage scenario information may be determined based on the usage scenario information by using a pre-stored correspondence between the usage scenario information and the background music. For example, if the use scenario information is a military introduction, the corresponding background music may be exciting music. If the use scenario information is a baby story, the corresponding background music may be light or lively music.

Figure 6:
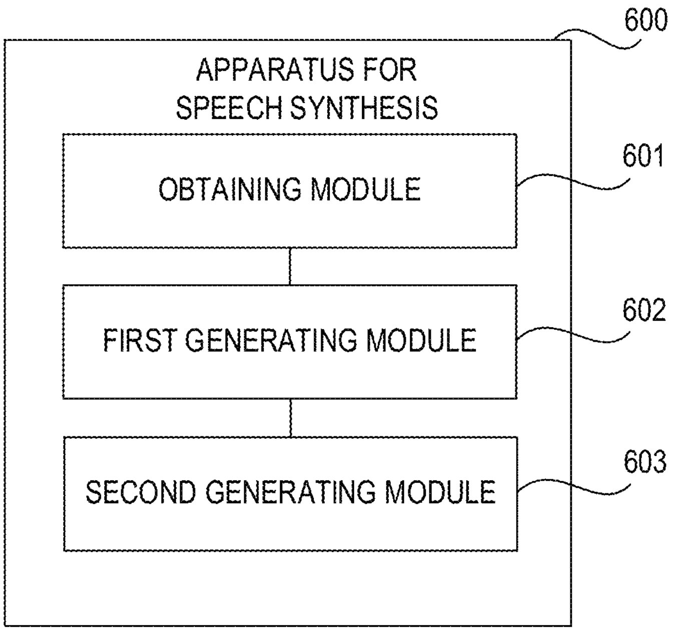
FIG. 6 is a block diagram illustrating a speech synthesis apparatus according to an example embodiment.

FIG. 6 is a block diagram of a speech synthesis apparatus according to an example embodiment. As shown in FIG. 6, the apparatus 600 comprises:

- an obtaining module 601 configured to obtain a phoneme sequence corresponding to a text to be synthesized;
- a first generating module 602 configured to generate a phonemic-level TOBI representation sequence and a prosodic-acoustic feature corresponding to the text to be synthesized according to the phoneme sequence and the text to be synthesized that are obtained by the obtaining module 601, and generate acoustic feature information corresponding to the text to be synthesized based on the TOBI representation sequence and the prosodic-acoustic feature;
- a second generating module 603 configured to generate, based on the acoustic feature information generated by the first generating module 602, first audio information corresponding to the text to be synthesized.

In the described technical solution, after a phoneme sequence corresponding to a text to be synthesized is obtained, a phonemic-level TOBI representation sequence and a prosodic-acoustic feature corresponding to the text to be synthesized are generated based on the phoneme sequence and the text to be synthesized, and an acoustic feature information corresponding to the text to be synthesized is generated based on the TOBI representation sequence and the prosodic-acoustic feature. Finally, first audio information corresponding to the text to be synthesized is generated based on the acoustic feature information. During the speech synthesis, a TOBI representation sequence corresponding to a text to be synthesized and a prosodic-acoustic feature are simultaneously referred to, i.e., not only a prosodic feature of a language level of the text to be synthesized is referred to, but also a prosodic feature of an acoustic level of the text to be synthesized is referred to, and the performance of the prosody in different dimensions is considered. Different sentences may be given appropriate rhythmic, emphasis and tone characteristics based on a TOBI representation sequence. Moreover, at the same time, a corresponding prosodic-acoustic feature may explicitly represent a specific acoustic reflection of a corresponding prosody event. Thus, the intensity (i.e., amplitude) of the audio is controlled while improving the prosody naturalness of the synthesized audio. For example, different intensities may be allocated at a plurality of readend positions so as to realize different emphasis focuses of semantic expression, or the change in the semantics of the interrogative sentence is achieved by intensity adjustment to convey different semantics (sentiment). Thus, under the same cadence language expression, different prosodic-acoustic features reflect different semantic changes, so that the synthesized audio is more natural with a lilting sound. The information conveyed by the synthesized audio conforms to with the semantics expressed by the speaker more closely. Alternatively, the first generating module 602 is configured to input the phoneme sequence and the text to be synthesized into a pre-trained speech synthesis model to generate phonemic-level TOBI representation sequences and prosodic-acoustic features corresponding to the text to be synthesized based on the phoneme sequence and the text to be synthesized by using the speech synthesis model, and based on the TOBI representation sequence and the prosodic-acoustic features, generating acoustic feature information corresponding to the text to be synthesized.

Alternatively, the first generating module 602 is configured to input the phoneme sequence and the text to be synthesized into a pre-trained speech synthesis model to generate phonemic-level TOBI representation sequences and prosodic-acoustic features corresponding to the text to be synthesized based on the phoneme sequence and the text to be synthesized by using the speech synthesis model, and based on the TOBI representation sequence and the prosodic-acoustic features, generating acoustic feature information corresponding to the text to be synthesized.

Alternatively, the speech synthesis model comprises an encoding network, an attention network, a decoding network, a prosodic language feature prediction module, a prosodic-acoustic feature prediction module, an embedded layer, a first splicing module, a second splicing module, and a third splicing module;

- the prosodic language feature predicting module is configured to generate, based on the text to be synthesized, a TOBI representation sequence of phonemic-level corresponding to the text to be synthesized;
- the embedded layer is configured to generate a phoneme representation sequence corresponding to the text to be synthesized according to the phoneme sequence;
- the first splicing module is configured to splice the phonemic-level TOBI representation sequence and the phoneme representation sequence to obtain a first splicing sequence;
- the encoding network is configured to encode the first splicing sequence to generate a coded sequence;
- the second splicing module is configured to splice the coded sequence and the phonemic-level TOBI representation sequence to obtain a second splicing sequence;
- the prosodic-acoustic feature predicting module is configured to generate a prosodic-acoustic feature corresponding to the text to be synthesized based on the second splicing sequence;
- the third splicing module is configured to splice the coded sequence and the prosodic-acoustic feature to obtain a third splicing sequence;
- the attention network is configured to generate, based on the third splicing sequence, a semantic representation corresponding to the text to be synthesized; and
- the decoding network is configured to generate, based on the semantic representation, acoustic feature information corresponding to the text to be synthesized;

Alternatively, the prosodic language feature predicting module comprises a first sub-embedded layer, a prosodic language feature predicting network, a second sub-embedded layer and an extension layer which are connected in sequence.

Here, the first sub-embedded layer is configured to extract a word-level deep representation corresponding to the text to be synthesized.

The prosodic language feature prediction network is configured to generate a word-level TOBI label based on the deep representation.

The second sub-embedded layer is configured to generate a word-level TOBI representation sequence corresponding to the text to be synthesized based on the TOBI label.

The extension layer is configured to extend the word-level TOBI representation sequence to obtain a phonemic-level TOBI representation sequence corresponding to the text to be synthesized.

Alternatively, the speech synthesis model is obtained by training with a model training apparatus. The apparatus for model training comprises:

- a training text obtaining module configured to obtain a training text;
- a determining module configured to determine a training phoneme sequence corresponding to the training text, a word-level training TOBI label, a training prosodic-acoustic feature, and training acoustic feature information; and
- a training module configured to perform model training by using the training text as an input of the first sub-embedded layer, using an output of the first sub-embedded layer as an input of the prosodic language feature prediction network, using the word-level training TOBI label as a target output for the prosodic language feature prediction network, using an output of the prosodic language feature prediction network as an input of the second sub-embedded layer, using an output of the second sub-embedded layer as an input of the extension layer, using the training phoneme sequence as an input of the embedded layer, using an output of the extended layer and an output of the embedded layer as inputs of the first splicing module, using an output of the first splicing module as an input of the encoding network, using an output of the encoding network and an output of the extension layer as inputs of the second splicing module, using an output of the second splicing module as an input of the prosodic-acoustic feature prediction module, using the prosodic-acoustic feature as a target output of the prosodic acoustic feature prediction module, using an output of the prosodic-acoustic feature prediction module and an output of the encoding network as inputs to the third splicing module, using an output of the third splicing module as an input of the attention network, using an output of the attention network as an input of the decoding network, and using the training acoustic feature information as a target output the decoding network, to obtain the speech synthesis model.

Alternatively, the prosodic-acoustic feature comprise at least one of a fundamental frequency, energy, or a pronunciation duration at a phonemic level corresponding to the text to be synthesized.

Alternatively, the apparatus 600 further comprises:

- a synthesis module configured to synthesize the first audio information and target background music to obtain second audio information.

It should be noted that, the foregoing model training apparatus may be integrated into the foregoing speech synthesis apparatus 600, and may also be independent of the foregoing speech synthesis apparatus 600, which is not specifically limited in the present disclosure.

The present disclosure further provides a computer readable medium having a computer program stored thereon, the computer program, when executed by a processing device, implementing steps of the method of the described speech synthesis method provided by the present disclosure.

In the described technical solution, after a phoneme sequence corresponding to a text to be synthesized is obtained, a phonemic-level TOBI representation sequence and a prosodic-acoustic feature corresponding to the text to be synthesized are generated according to the phoneme sequence and the text to be synthesized. Moreover, acoustic feature information corresponding to the text to be synthesized is generated according to the TOBI representation sequence and the prosodic-acoustic feature. Finally, first audio information corresponding to the text to be synthesized is generated according to the acoustic feature information. During speech synthesis, a TOBI representation sequence corresponding to a text to be synthesized and a prosodic-acoustic feature are simultaneously referred to, i.e. not only a prosodic feature of a language level of the text to be synthesized is referred to, but also a prosodic feature of an acoustic level of the text to be synthesized is referred to, and the performance of the prosody in different dimensions is considered. Different sentences may be given appropriate rhythmic, emphasis and tone characteristics, and a corresponding prosodic-acoustic feature may explicitly represent a specific acoustic reflection of a corresponding prosody event based on a TOBI representation sequence. Thus, the intensity (i.e., amplitude) of the audio is controlled while improving the prosody naturalness of the synthesized audio, for example, different intensities may be allocated at a plurality of stress positions so as to realize different emphasis focuses of semantic expression, or the change in the semantics of the interrogative sentence is achieved by intensity adjustment to convey different semantics (emotions). Thus, under the same prosody language expression, different prosodic-acoustic characteristics reflect different semantic changes, so that the synthesized audio is more natural and providing a lilting listening feeling. The information conveyed by the synthesized audio conforms with the semantics expressed by the speaker more closely.

Figure 7:
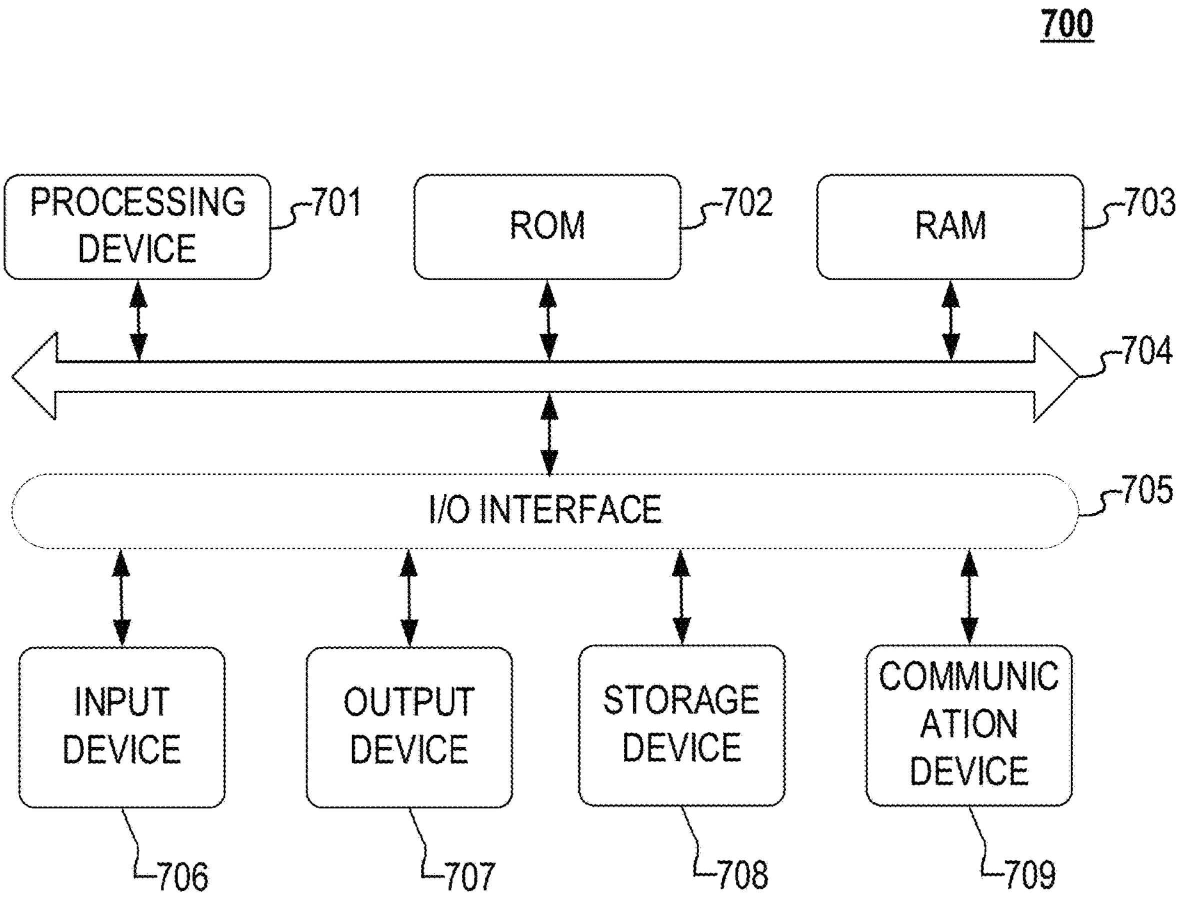
FIG. 7 is a block diagram illustrating an electronic device according to an example embodiment.

Referring now to FIG. 7, there is shown a block diagram of an electronic device (terminal device or server) 700 for implementing an embodiment of the present disclosure. The terminal apparatus in the embodiment of the present disclosure may comprise, but is not limited to, a mobile terminal such as a mobile phone, a laptop computer, a digital broadcast receiver, a Personal Digital Assistant (PDA), a tablet Personal Digital Assistant (PDA), a Portable Multimedia Player (PMP), a vehicle-mounted terminal (e.g., a vehicle-mounted navigation terminal), and the like, and a fixed terminal such as a digital TV, a desktop computer, and the like. The electronic device shown in FIG. 7 is merely an example and should not bring any limitation to the functions and scope of use of embodiments of the present disclosure.

As shown in FIG. 7, the electronic device 700 may comprise a processing apparatus (e.g., central processing unit, graphics processor, etc.) 701 that may perform various suitable actions and processes in accordance with a program stored in a read-only memory (ROM) 702 or a program loaded into a random access memory (RAM) 703 from a storage device 708. A variety of programs and data necessary for the operation of the electronic device 700 are also stored in the RAM 703. The processing apparatus 701, the ROM 702, and the RAM 703 are connected to each other via the bus 704. An input/output (I/O) interface 705 is also connected to the bus 704.

In general, the following devices may be connected to the I/O interface 705: an input device 706 including, for example, a touch screen, a touch pad, a keyboard, a mouse, a camera, a microphone, an accelerometer, a gyroscope, or the like; an output device 707 comprising, for example, a liquid crystal display (LCD), a speaker, a vibrator, or the like; a storage device 708 comprising, for example, a magnetic tape, a hard disk, or the like; and a communication device 709. Communication device 709 may allow electronic device 700 to communicate wirelessly or wired with other devices to exchange data. While FIG. 7 illustrates an electronic device 700 having various means, it is to be understood that not all of the illustrated means are required to be implemented or provided. More or fewer devices may alternatively be implemented or provided.

In particular, the processes described above with reference to the flowcharts may be implemented as computer software programs in accordance with embodiments of the present disclosure. For example, embodiments of the disclosure comprise a computer program product comprising a computer program carried on a non-transitory computer-readable medium, the computer program comprising program code for performing the method as shown in the flowchart. In such an embodiment, the computer program may be downloaded and installed from the network through the communication device 709, installed from the storage device 708, or installed from the ROM 702. When the computer program is executed by the processing apparatus 701, the described functions defined in the method according to the embodiment of the present disclosure are executed.

It should be noted that the computer readable medium in the present disclosure may be a computer readable signal medium or a computer readable storage medium, or any combination thereof. A computer-readable storage medium may be, for example, but not limited to, an electronic, magnetic, optical, electromagnetic, infrared, or semiconductor system, apparatus, or device, or any suitable combination of the foregoing. More specific examples of the computer readable storage medium may comprise, but are not limited to, an electrical connection having one or more wires, a portable computer diskette, a hard disk, a random access memory (RAM), a read-only memory (ROM), an erasable programmable read-only memory (Erasable Programmable Read Only Memory (EPROM) or flash memory), an optical fiber, a portable compact disc read only memory (CD-ROM), an optical storage device, a magnetic storage device, or any suitable combination of the foregoing. In the present disclosure, a computer readable storage medium may be any tangible medium that may contain or store a program for use by or in connection with an instruction execution system, apparatus, or device. While in the present disclosure, a computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may also be any computer readable medium that is not a computer readable storage medium and that may communicate, propagate, or transport a program for use by or in connection with an instruction execution system, apparatus, or device. Program code embodied on a computer readable medium may be transmitted using any appropriate medium, including, but not limited to, wireline, optical fiber cable, RF (radio frequency), etc., or any suitable combination of the foregoing.

In some embodiments, clients, servers may communicate using any currently known or future developed network protocol such as Hypertext Transfer Brief of the case (HTTP) and may be interconnected with digital data communication (e.g., a communication network) in any form or medium. Examples of communication networks include a local area network (Local Area Network, LAN), a wide area network (Wide Area Network, WAN), internets (e.g., the Internet), and peer-to-peer networks (e.g., ad hoc peer-to-peer networks), as well as any currently known or future developed network.

The computer readable medium may be included in the electronic device, or may exist separately and not be installed in the electronic device.

The computer readable medium carries one or more programs, the one or more programs when executed by the electronic device, causing the electronic device to: obtain a phoneme sequence corresponding to text to be synthesized; generate a phonemic-level TOBI representation sequence and a prosodic-acoustic feature corresponding to the text to be synthesized based on the phoneme sequence and the text to be synthesized, and generate acoustic feature information corresponding to the text to be synthesized based on the TOBI representation sequence and the prosodic-acoustic feature; and generate first audio information corresponding to the text to be synthesized based on the acoustic feature information.

Computer program code for carrying out operations for aspects of the present disclosure may be written in any combination of one or more programming languages, comprising, but not limited to, an object oriented programming language such as Java, Smalltalk, C++ or the like and conventional procedural programming languages, such as the 'C' programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

The modules involved in the embodiments of the present disclosure may be implemented by software or by hardware.

The name of the module does not limit the module itself in a certain case. For example, the obtaining module may also be described as ‘a module for obtaining the phoneme sequence corresponding to the text to be synthesized’.

The functions described herein above may be performed, at least in part, by one or more hardware logic components. For example, example types of hardware logic components that may be used include, without limitation, Field Programmable Gate Arrays (FPGA), Application Specific Integrated Circuit (ASIC), Application Specific Standard Parts (ASSP), System On Chip (SO), Complex Programmable Logic Devices (CPLD), etc.

In the context of this disclosure, a machine-readable medium may be tangible media that may contain or store a program for use by or in connection with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the foregoing. More specific examples of machine-readable storage media would include an electrical connection based on one or more wires, a portable computer diskette, a hard disk, a random access memory (RAM), a read-only memory (ROM), an erasable programmable read-only memory (EPROM or Flash memory), an optical fiber, a compact disc read-only memory (CD-ROM), an optical storage device, a magnetic storage device, or any suitable combination of the foregoing.

According to one or more embodiments of the present disclosure, example 1 provides a speech synthesis method, comprising: obtaining a phoneme sequence corresponding to text to be synthesized; generating a phonemic-level TOBI representation sequence and a prosodic-acoustic feature corresponding to the text to be synthesized based on the phoneme sequence and the text to be synthesized, and generating acoustic feature information corresponding to the text to be synthesized based on the TOBI representation sequence and the prosodic-acoustic feature; and generating first audio information corresponding to the text to be synthesized based on the acoustic feature information.

According to one or more embodiments of the present disclosure, Example 2 provides the method of Example 1, wherein the generating a phonemic-level TOBI representation sequence and a prosodic-acoustic feature corresponding to the text to be synthesized based on the phoneme sequence and the text to be synthesized, and generating acoustic feature information corresponding to the text to be synthesized based on the TOBI representation sequence and the prosodic-acoustic feature comprises: inputting the phoneme sequence and the text to be synthesized into a pre-trained speech synthesis model, to generate, via the speech synthesis model, the phonemic-level TOBI representation sequence and the prosodic-acoustic feature corresponding to the text to be synthesized based on the phoneme sequence and the text to be synthesized, and generate the acoustic feature information corresponding to the text to be synthesized based on the TOBI representation sequence and the prosodic-acoustic feature.

According to one or more embodiments of the present disclosure, example 3 provides the method of example 2, wherein the speech synthesis model comprises an encoding network, an attention network, a decoding network, a prosodic language feature prediction module, a prosodic-acoustic feature prediction module, an embedded layer, a first splicing module, a second splicing module, and a third splicing module; wherein the prosodic language feature prediction module is configured to generate, based on the text to be synthesized, a phonemic-level TOBI representation sequence corresponding to the text to be synthesized; the embedded layer is configured to generate a phoneme representation sequence corresponding to the text to be synthesized based on the phoneme sequence; the first splicing module is configured to splice the phonemic-level TOBI representation sequence and the phoneme representation sequence to obtain a first splicing sequence; the encoding network is configured to encode the first splicing sequence to generate a coded sequence; the second splicing module is configured to splice the coded sequence and the phonemic level TOBI representation sequence to obtain a second splicing sequence; the prosodic-acoustic feature prediction module is configured to generate the prosodic-acoustic feature corresponding to the text to be synthesized based on the second splicing sequence; the third splicing module is configured to splice the coding sequence and the prosodic-acoustic feature to obtain a third splicing sequence; the attention network is configured to generate, based on the third splicing sequence, a semantic representation corresponding to the text to be synthesized; and the decoding network is configured to generate, based on the semantic representation, acoustic feature information corresponding to the text to be synthesized.

According to one or more embodiments of the present disclosure, Example 4 provides the method of Example 3, the prosodic language feature prediction module comprises a first sub-embedded layer, a prosodic language feature prediction network, a second sub-embedded layer and an extension layer which are sequentially connected. Wherein the first sub-embedded layer is configured to extract a word-level deep representation corresponding to the text to be synthesized. The prosodic language feature prediction network is configured to generate a word-level TOBI label based on the deep representation. The second sub-embedded layer is configured to generate a word-level TOBI representation sequence corresponding to the text to be synthesized based on the TOBI label. The extension layer is configured to extend the word-level TOBI representation sequence to obtain a phonemic-level TOBI representation sequence corresponding to the text to be synthesized.

According to one or more embodiments of the present disclosure, Example 5 provides the method of Example 4, wherein the speech synthesis model is obtained by training in the following manner: obtaining training text; determining a training phoneme sequence corresponding to the training text, a word-level training TOBI label, a training prosodic-acoustic feature and training acoustic feature information; and performing model training by using the training text as an input of the first sub-embedded layer, using an output of the first sub-embedded layer as an input of the prosodic language feature prediction network, using the word-level training TOBI label as a target output for the prosodic language feature prediction network, using an output of the prosodic language feature prediction network as an input of the second sub-embedded layer, using an output of the second sub-embedded layer as an input of the extension layer, using the training phoneme sequence as an input of the embedded layer, using an output of the extended layer and an output of the embedded layer as inputs of the first splicing module, using an output of the first splicing module as an input of the encoding network, using an output of the encoding network and an output of the extension layer as inputs of the second splicing module, using an output of the second splicing module as an input of the prosodic-acoustic feature prediction module, using the prosodic-acoustic feature as a target output of the prosodic-acoustic feature prediction module, using an output of the prosodic-acoustic feature prediction module and an output of the encoding network as inputs to the third splicing module, using an output of the third splicing module as an input of the attention network, using an output of the attention network as an input of the decoding network, and using the training acoustic feature information as a target output the decoding network, to obtain the speech synthesis model.

According to one or more embodiments of the present disclosure, example 6 provides the method of any of examples 1-5, the prosodic-acoustic features comprises at least one of a fundamental frequency, energy, or a pronunciation duration at a phonemic level corresponding to the text to be synthesized.

According to one or more embodiments of the present disclosure, example 7 provides the method of any one of examples 1-5, and the method further comprises: obtaining second audio information by synthesizing the first audio information and target background music.

According to one or more embodiments of the present disclosure, example 8 provides a speech synthesis apparatus, comprising: an obtaining module configured to obtain a phoneme sequence corresponding to a text to be synthesized; a first generating module configured to generate a phonemic-level TOBI representation sequence and a prosodic-acoustic feature corresponding to the text to be synthesized based on the phoneme sequence obtained by the acquiring module and the text to be synthesized, and to generate acoustic feature information corresponding to the text to be synthesized based on the TOBI representation sequence and the prosodic-acoustic feature; and a second generating module configured to generate, based on the acoustic feature information generated by the first generation module, first audio information corresponding to the text to be synthesized.

According to one or more embodiments of the present disclosure, example 9 provides the apparatus of example 8, wherein the first generating module is configured to input the phoneme sequence and the text to be synthesized into a pre-trained speech synthesis model, generate phonemic-level TOBI representation sequences and prosodic-acoustic features corresponding to the text to be synthesized based on the phoneme sequence and the text to be synthesized by using the speech synthesis model, and generate acoustic feature information corresponding to the text to be synthesized based on the TOBI representation sequence and the prosodic-acoustic features.

According to one or more embodiments of the disclosure, Example 10 provides the apparatus of Example 9, the speech synthesis model comprising an encoding network, a attention network, a decoding network, a prosodic feature prediction module, a prosodic-acoustic feature prediction module, an embedded layer, a first splicing module, a second splicing module, and a third splicing module. Wherein the prosodic language feature predicting module is configured to generate, based on the text to be synthesized, a TOBI representation sequence of phonemic-level corresponding to the text to be synthesized. The embedded layer is configured to generate a phoneme representation sequence corresponding to the text to be synthesized according to the phoneme sequence; The first splicing module is configured to splice the phonemic-level TOBI representation sequence and the phoneme representation sequence to obtain a first splicing sequence. The encoding network is configured to encode the first splicing sequence to generate a coded sequence. The second splicing module is configured to splice the coded sequence and the phonemic-level TOBI representation sequence to obtain a second splicing sequence. The prosodic-acoustic feature predicting module is configured to generate a prosodic-acoustic feature corresponding to the text to be synthesized based on the second splicing sequence. The third splicing module is configured to splice the coded sequence and the prosodic-acoustic feature to obtain a third splicing sequence. The attention network is configured to generate, based on the third splicing sequence, a semantic representation corresponding to the text to be synthesized. The decoding network is configured to generate, based on the semantic representation, acoustic feature information corresponding to the text to be synthesized.

According to one or more embodiments of the disclosure, example 11 provides the apparatus of example 10, the prosodic language feature prediction module comprising a first sub-embedded layer, a prosodic language feature prediction network, a second sub-embedded layer and an extension layer which are sequentially connected. Wherein the first sub-embedded layer is configured to extract a word-level deep representation corresponding to the text to be synthesized. The prosodic language feature prediction network is configured to generate a word-level TOBI label based on the deep representation. The second sub-embedded layer is configured to generate a word-level TOBI representation sequence corresponding to the text to be synthesized based on the TOBI label. The extension layer is configured to extend the word-level TOBI representation sequence to obtain a phonemic-level TOBI representation sequence corresponding to the text to be synthesized.

According to one or more embodiments of the present disclosure, Example 12 provides the apparatus of Example 11, wherein the speech synthesis model is obtained by training by using a model training apparatus, and the model training apparatus comprises: a training text obtaining module configured to obtain a training text; a determining module configured to determine a training phoneme sequence corresponding to the training text, a word-level training TOBI label, a training prosodic-acoustic feature, and training acoustic feature information; a training module configured to perform model training by using the training text as an input of the first sub-embedded layer, using an output of the first sub-embedded layer as an input of the prosodic language feature prediction network, using the word-level training TOBI label as a target output for the prosodic language feature prediction network, using an output of the prosodic language feature prediction network as an input of the second sub-embedded layer, using an output of the second sub-embedded layer as an input of the extension layer, using the training phoneme sequence as an input of the embedded layer, using an output of the extended layer and an output of the embedded layer as inputs of the first splicing module, using an output of the first splicing module as an input of the encoding network, using an output of the encoding network and an output of the extension layer as inputs of the second splicing module, using an output of the second splicing module as an input of the prosodic-acoustic feature prediction module, using the prosodic-acoustic feature as a target output of the prosodic acoustic feature prediction module, using an output of the prosodic-acoustic feature prediction module and an output of the encoding network as inputs to the third splicing module, using an output of the third splicing module as an input of the attention network, using an output of the attention network as an input of the decoding network, and using the training acoustic feature information as a target output the decoding network, to obtain the speech synthesis model.

According to one or more embodiments of the present disclosure, Example 13 provides the apparatus of any one of Examples 8-12, the prosodic-acoustic features comprising at least one of a fundamental frequency, energy, or a pronunciation duration at a phonemic level corresponding to the text to be synthesized.

According to one or more embodiments of the present disclosure, Example 14 provides the apparatus of any one of Examples 8 to 12. The apparatus further comprises: a synthesis module configured to synthesize the first audio information and target background music to obtain second audio information.

According to one or more embodiments of the disclosure, example 15 provides a computer-readable medium having a computer program stored thereon, the computer program, when executed by a processing device, implementing steps of the method of any of examples 1-7.

According to one or more embodiments of the present disclosure, Example 16 provides an electronic device, comprising: a storage device having at least one computer program stored thereon; at least one processing apparatus configured to execute the at least one computer program in the storage device to implement steps of the method of any of examples 1-7.

According to one or more embodiments of the present disclosure, example 17 provides a computer program when executed by a processing apparatus, implementing steps of the method of any of examples 1-7.

According to one or more embodiments of the present disclosure, example 18 provides a computer program product, the computer program product comprising a computer program which, when executed by a processing device, implements steps of the method of any of examples 1-7.

The foregoing description is merely illustrative of the preferred embodiments of the present disclosure and of the technical principles applied thereto, as will be appreciated by those skilled in the art, The disclosure of the present disclosure is not limited to the technical solution formed by the specific combination of the described technical features, At the same time, it should also cover other technical solutions formed by any combination of the described technical features or equivalent features thereof without departing from the described disclosed concept. For example, the above features and technical features having similar functions disclosed in the present disclosure (but not limited thereto) are replaced with each other to form a technical solution.

In addition, while operations are depicted in a particular order, this should not be understood as requiring that the operations be performed in the particular order shown or in sequential order. Multitasking and parallel processing may be advantageous in certain circumstances. Likewise, while several specific implementation details are included in the above discussion, these should not be construed as limiting the scope of the present disclosure. Certain features that are described in the context of separate embodiments may also be implemented in combination in a single embodiment. Conversely, various features that are described in the context of a single embodiment may also be implemented in multiple embodiments separately or in any suitable subcombination.

Although the subject matter has been described in language specific to structural features and/or methodological acts, it is to be understood that the subject matter defined in the appended claims is not necessarily limited to the specific features or acts described above. Rather, the specific features and acts described above are merely example forms of implementing the claims. With respect to the apparatus in the foregoing embodiments, the specific manner in which the modules execute the operations has been described in detail in the embodiments of the method, and is not described in detail herein.

What is claimed is:

1. A method of speech synthesis, comprising:

obtaining a phoneme sequence corresponding to text to be synthesized;

inputting the phoneme sequence and the text to be synthesized into a speech synthesis model;

generating, via the speech synthesis model, a phonemic-level tones and break indices (TOBI) representation sequence and a prosodic-acoustic feature corresponding to the text to be synthesized based on the phoneme sequence and the text to be synthesized, and generating acoustic feature information corresponding to the text to be synthesized based on the TOBI representation sequence and the prosodic-acoustic feature; and generating first audio information corresponding to the text to be synthesized based on the acoustic feature information, wherein the speech synthesis model comprises an encoding network, an attention network a decoding network, a prosodic language feature prediction module, a prosodic-acoustic feature prediction module, an embedded layer, a first splicing module, a second splicing module, and a third splicing module, the prosodic language feature prediction module is configured to generate, based on the text to be synthesized, a phonemic-level TOBI representation sequence corresponding to the text to be synthesized, the embedded layer is configured to generate a phoneme representation sequence corresponding to the text to be synthesized based on the phoneme sequence, the first splicing module is configured to splice the phonemic-level TOBI representation sequence and the phoneme representation sequence to obtain a first splicing sequence, the encoding network is configured to encode the first splicing sequence to generate a coded sequence, the second splicing module is configured to splice the coded sequence and the phonemic level TOBI representation sequence to obtain a second splicing sequence, the prosodic-acoustic feature prediction module is configured to generate the prosodic-acoustic feature corresponding to the text to be synthesized based on the second splicing sequence, the third splicing module is configured to splice the coding sequence and the prosodic-acoustic feature to obtain a third splicing sequence, the attention network is configured to generate, based on the third splicing sequence, a semantic representation corresponding to the text to be synthesized, and the decoding network is configured to generate, based on the semantic representation, acoustic feature information corresponding to the text to be synthesized.

2. The method of claim 1, wherein the prosodic language feature prediction module comprises a first sub-embedded layer, a prosodic language feature prediction network, a second sub-embedded layer and an extension layer which are sequentially connected;

wherein the first sub-embedded layer is configured to extract a word-level deep representation corresponding to the text to be synthesized;

the prosodic language feature prediction network is configured to generate a word-level TOBI label based on the deep representation;

the second sub-embedded layer is configured to generate a word-level TOBI representation sequence corresponding to the text to be synthesized based on the TOBI label; and the extension layer is configured to extend the word-level TOBI representation sequence to obtain a phonemic-level TOBI representation sequence corresponding to the text to be synthesized.

3. The method of claim 2, wherein the speech synthesis model is obtained by training in the following manner:

obtaining training text;

determining a training phoneme sequence corresponding to the training text, a word-level training TOBI label, a training prosodic-acoustic feature and training acoustic feature information; and performing model training by using the training text as an input of the first sub-embedded layer, using an output of the first sub-embedded layer as an input of the prosodic language feature prediction network, using the word-level training TOBI label as a target output for the prosodic language feature prediction network, using an output of the prosodic language feature prediction network as an input of the second sub-embedded layer, using an output of the second sub-embedded layer as an input of the extension layer, using the training phoneme sequence as an input of the embedded layer, using an output of the extended layer and an output of the embedded layer as inputs of the first splicing module, using an output of the first splicing module as an input of the encoding network, using an output of the encoding network and an output of the extension layer as inputs of the second splicing module, using an output of the second splicing module as an input of the prosodic-acoustic feature prediction module, using the prosodic-acoustic feature as a target output of the prosodic-acoustic feature prediction module, using an output of the prosodic-acoustic feature prediction module and an output of the encoding network as inputs to the third splicing module, using an output of the third splicing module as an input of the attention network, using an output of the attention network as an input of the decoding network, and using the training acoustic feature information as a target output the decoding network, to obtain the speech synthesis model.

4. The method of claim 1, wherein the prosodic-acoustic features comprises at least one of a fundamental frequency, energy, or a pronunciation duration at a phonemic level corresponding to the text to be synthesized.

5. The method of claim 1, further comprising:

obtaining second audio information by synthesizing the first audio information and target background music.

6. An electronic device, comprising:

a storage device having at least one computer program stored thereon;

at least one processing apparatus configured to execute the at least one computer program in the storage device to implement acts comprising:

obtaining a phoneme sequence corresponding to text to be synthesized;

inputting the phoneme sequence and the text to be synthesized into a speech synthesis model;

generating, via the speech synthesis model, a phonemic-level tones and break indices (TOBI) representation sequence and a prosodic-acoustic feature corresponding to the text to be synthesized based on the phoneme sequence and the text to be synthesized, and generating acoustic feature information corresponding to the text to be synthesized based on the TOBI representation sequence and the prosodic-acoustic feature; and generating first audio information corresponding to the text to be synthesized based on the acoustic feature information, wherein the speech synthesis model comprises an encoding network, an attention network, a decoding network, a prosodic language feature prediction module, a prosodic-acoustic feature prediction module, an embedded layer, a first splicing module, a second splicing module, and a third splicing module, the prosodic language feature prediction module is configured to generate, based on the text to be synthesized, a phonemic-level TOBI representation sequence corresponding to the text to be synthesized, the embedded layer is configured to generate a phoneme representation sequence corresponding to the text to be synthesized based on the phoneme sequence, the first splicing module is configured to splice the phonemic-level TOBI representation sequence and the phoneme representation sequence to obtain a first splicing sequence, the encoding network is configured to encode the first splicing sequence to generate a coded sequence, the second splicing module is configured to splice the coded sequence and the phonemic level TOBI representation sequence to obtain a second splicing sequence, the prosodic-acoustic feature prediction module is configured to generate the prosodic-acoustic feature corresponding to the text to be synthesized based on the second splicing sequence, the third splicing module is configured to splice the coding sequence and the prosodic-acoustic feature to obtain a third splicing sequence, the attention network is configured to generate, based on the third splicing sequence, a semantic representation corresponding to the text to be synthesized, and the decoding network is configured to generate, based on the semantic representation, acoustic feature information corresponding to the text to be synthesized.

7. The device of claim 6, wherein the prosodic language feature prediction module comprises a first sub-embedded layer, a prosodic language feature prediction network, a second sub-embedded layer and an extension layer which are sequentially connected;

wherein the first sub-embedded layer is configured to extract a word-level deep representation corresponding to the text to be synthesized;

the prosodic language feature prediction network is configured to generate a word-level TOBI label based on the deep representation;

the second sub-embedded layer is configured to generate a word-level TOBI representation sequence corresponding to the text to be synthesized based on the TOBI label; and the extension layer is configured to extend the word-level TOBI representation sequence to obtain a phonemic-level TOBI representation sequence corresponding to the text to be synthesized.

8. The device of claim 7, wherein the speech synthesis model is obtained by training in the following manner:

obtaining training text;

determining a training phoneme sequence corresponding to the training text, a word-level training TOBI label, a training prosodic-acoustic feature and training acoustic feature information; and performing model training by using the training text as an input of the first sub-embedded layer, using an output of the first sub-embedded layer as an input of the prosodic language feature prediction network, using the word-level training TOBI label as a target output for the prosodic language feature prediction network, using an output of the prosodic language feature prediction network as an input of the second sub-embedded layer, using an output of the second sub-embedded layer as an input of the extension layer, using the training phoneme sequence as an input of the embedded layer, using an output of the extended layer and an output of the embedded layer as inputs of the first splicing module, using an output of the first splicing module as an input of the encoding network, using an output of the encoding network and an output of the extension layer as inputs of the second splicing module, using an output of the second splicing module as an input of the prosodic-acoustic feature prediction module, using the prosodic-acoustic feature as a target output of the prosodic-acoustic feature prediction module, using an output of the prosodic-acoustic feature prediction module and an output of the encoding network as inputs to the third splicing module, using an output of the third splicing module as an input of the attention network, using an output of the attention network as an input of the decoding network, and using the training acoustic feature information as a target output the decoding network, to obtain the speech synthesis model.

9. The device of claim 6, wherein the prosodic-acoustic features comprises at least one of a fundamental frequency, energy, or a pronunciation duration at a phonemic level corresponding to the text to be synthesized.

10. The device of claim 6, the acts further comprising:

obtaining second audio information by synthesizing the first audio information and target background music.

11. A non-transitory computer readable medium having a computer program stored thereon, the computer program, when executed by a processing device, implementing acts comprising:

obtaining a phoneme sequence corresponding to text to be synthesized;

inputting the phoneme sequence and the text to be synthesized into a speech synthesis model;

generating, via the speech synthesis model, a phonemic-level tones and break indices (TOBI) representation sequence and a prosodic-acoustic feature corresponding to the text to be synthesized based on the phoneme sequence and the text to be synthesized, and generating acoustic feature information corresponding to the text to be synthesized based on the TOBI representation sequence and the prosodic-acoustic feature; and generating first audio information corresponding to the text to be synthesized based on the acoustic feature information, wherein the speech synthesis model comprises an encoding network, an attention network, a decoding network, a prosodic language feature prediction module, a prosodic-acoustic feature prediction module, an embedded layer, a first splicing module, a second splicing module, and a third splicing module, the prosodic language feature prediction module is configured to generate, based on the text to be synthesized, a phonemic-level TOBI representation sequence corresponding to the text to be synthesized, the embedded layer is configured to generate a phoneme representation sequence corresponding to the text to be synthesized based on the phoneme sequence, the first splicing module is configured to splice the phonemic-level TOBI representation sequence and the phoneme representation sequence to obtain a first splicing sequence, the encoding network is configured to encode the first splicing sequence to generate a coded sequence, the second splicing module is configured to splice the coded sequence and the phonemic level TOBI representation sequence to obtain a second splicing sequence, the prosodic-acoustic feature prediction module is configured to generate the prosodic-acoustic feature corresponding to the text to be synthesized based on the second splicing sequence, the third splicing module is configured to splice the coding sequence and the prosodic acoustic feature to obtain a third splicing sequence, the attention network is configured to generate, based on the third splicing sequence, a semantic representation corresponding to the text to be synthesized, and the decoding network is configured to generate, based on the semantic representation, acoustic feature information corresponding to the text to be synthesized.

12. The non-transitory computer readable medium of claim 11, wherein the prosodic language feature prediction module comprises a first sub-embedded layer, a prosodic language feature prediction network, a second sub-embedded layer and an extension layer which are sequentially connected;

wherein the first sub-embedded layer is configured to extract a word-level deep representation corresponding to the text to be synthesized;

the prosodic language feature prediction network is configured to generate a word-level TOBI label based on the deep representation;

the second sub-embedded layer is configured to generate a word-level TOBI representation sequence corresponding to the text to be synthesized based on the TOBI label; and the extension layer is configured to extend the word-level TOBI representation sequence to obtain a phonemic-level TOBI representation sequence corresponding to the text to be synthesized.

13. The non-transitory computer readable medium of claim 12, wherein the speech synthesis model is obtained by training in the following manner:

obtaining training text;

determining a training phoneme sequence corresponding to the training text, a word-level training TOBI label, a training prosodic-acoustic feature and training acoustic feature information; and performing model training by using the training text as an input of the first sub-embedded layer, using an output of the first sub-embedded layer as an input of the prosodic language feature prediction network, using the word-level training TOBI label as a target output for the prosodic language feature prediction network, using an output of the prosodic language feature prediction network as an input of the second sub-embedded layer, using an output of the second sub-embedded layer as an input of the extension layer, using the training phoneme sequence as an input of the embedded layer, using an output of the extended layer and an output of the embedded layer as inputs of the first splicing module, using an output of the first splicing module as an input of the encoding network, using an output of the encoding network and an output of the extension layer as inputs of the second splicing module, using an output of the second splicing module as an input of the prosodic-acoustic feature prediction module, using the prosodic-acoustic feature as a target output of the prosodic-acoustic feature prediction module, using an output of the prosodic-acoustic feature prediction module and an output of the encoding network as inputs to the third splicing module, using an output of the third splicing module as an input of the attention network, using an output of the attention network as an input of the decoding network, and using the training acoustic feature information as a target output the decoding network, to obtain the speech synthesis model.

14. The non-transitory computer readable medium of claim 11, wherein the prosodic-acoustic features comprises at least one of a fundamental frequency, energy, or a pronunciation duration at a phonemic level corresponding to the text to be synthesized.

* * * * *